United States Patent
Ichihara et al.

(10) Patent No.: US 6,749,347 B1
(45) Date of Patent: Jun. 15, 2004

(54) LASER DIODE MODULE AND ASSEMBLING METHOD THEREFOR

(75) Inventors: Yasuhiro Ichihara, Kawasaki (JP); Takashi Shiotani, Kawasaki (JP); Toshiya Kishida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/714,225

(22) Filed: Nov. 17, 2000

(30) Foreign Application Priority Data

Mar. 30, 2000 (JP) .................................... 2000-094961

(51) Int. Cl.[7] ................................................ G02B 6/36
(52) U.S. Cl. ........................ 385/93; 385/90; 385/91; 385/92; 385/94; 385/88
(58) Field of Search ............................. 385/93, 90, 91, 385/92, 94, 88; 372/6

(56) References Cited

U.S. PATENT DOCUMENTS 5,787,215 A * 7/1998 Kuhara et al. ............. 359/115
5,963,696 A * 10/1999 Yoshida et al. ............. 359/900

FOREIGN PATENT DOCUMENTS

| JP | 03071103 A | 3/1991 |
| JP | 11017199 A | 1/1999 |
| JP | 11211937 A | 8/1999 |
| JP | 11295559 A | 10/1999 |

* cited by examiner

*Primary Examiner*—Robert H. Kim
*Assistant Examiner*—George Y. Wang
(74) *Attorney, Agent, or Firm*—Staas & Halsey LLP

(57) ABSTRACT

A laser diode module including a laser diode assembly having a laser diode and a holder, a lens-fiber assembly having a lens and an optical fiber fixed in a given positional relationship, and a sleeve. The lens-fiber assembly includes a casing having a first hole and a second hole offset from the first hole. The lens is inserted and fixed in the first hole, and a ferrule in which the optical fiber is embedded is press-fitted with the second hole. The ferrule has a slant polished first end and a second end projecting from an end surface of the casing by a given distance. The lens and the ferrule are fixed in the casing so that a given distance is defined between the lens and the first end of the ferrule.

9 Claims, 5 Drawing Sheets

LASER DIODE MODULE AND ASSEMBLING METHOD THEREFOR

BACKGROUND OF THE INVENTION

1. Field of the Invention

The present invention relates to a laser diode module (LD module) for optically coupling a laser diode (LD) and an optical fiber.

2. Description of the Related Art

In an optical communication system using an optical fiber as a transmission line, an LD module is used to introduce light emitted from a light emitting component (e.g., laser diode) into the optical fiber. In the LD module, the light emitting component and the incident end face of the optical fiber are fixed in a given positional relationship, and a condenser lens is interposed between the light emitting component and the incident end face of the optical fiber. In this kind of LD module, the positional relation between components has a direct effect on optical coupling efficiency, so that the components must be positioned with an extremely high accuracy as less than or equal to 1 µm. Further, this positioning accuracy must be maintained for a long period of time.

The components mounted on a printed wiring board built in a communications device are generally classified into a surface mount type and a through hole mount type. A typical example of the surface mount type components is an LSI, which has a form called a flat package. Such a component is soldered to the printed wiring board by a reflow soldering process. This process is performed by printing a solder paste on the printed wiring board, making the surface mount type component stick to the printed solder paste, and heating the whole in a conveyor oven to a solder surface temperature of 220° C. or higher.

A typical example of the through hole mount type components is a large-capacity capacitor or a multi-terminal (200 or more terminals) LSI. The multi-terminal LSI has a terminals form called a PGA (Pin Grid Array). Such a through hole mount type component is soldered to the printed wiring board by a flow soldering process. This process is performed by inserting the terminals of the through hole mount type component into through holes of the printed wiring board, and putting the printed wiring board into a solder bath heated at about 260° C. from the side opposite to its component mounting surface.

In mounting an optical module such as an LD module on the printed wiring board by soldering like the surface mount type component or the through hole mount type component, a so-called pigtail type of optical module with an optical fiber cord is not suitable as the optical module. That is, the optical fiber cord usually has a nylon coating, and the nylon coating has a low resistant to heat at about 80° C., so that it is melted in the soldering step. Furthermore, the optical fiber cord itself invites inconveniences in accommodation and handling at a manufacturing location, causing a remarkable reduction in mounting efficiency to the printed wiring board. Accordingly, to allow a soldering process for the optical module and reduce a manufacturing cost, the application of a so-called receptacle type of optical module is indispensable, excluding the optical fiber cord.

In general, a conventional receptacle LD module has a female type receptacle structure adapted to receive a ferrule of an optical connector as disclosed in Japanese Patent Laid-open No. Hei 11-295559. The female type LD module is composed of an LD package, a receptacle assembly for receiving the ferrule of the optical connector, and a sleeve interposed between the LD package and the receptacle assembly for allowing triaxial adjustment of the receptacle assembly relative to a laser diode (LD) mounted in the LD package.

The conventional female type receptacle LD module is assembled by the following method. First, the LD package, the sleeve, and the receptacle assembly in which a lens is inserted and fixed are set on an assembling jig. An LD driving power supply is connected to the LD in the LD package, and a laser beam is emitted from the LD. On the other hand, the ferrule projecting from one end of the optical connector is inserted into the receptacle assembly, and an optical power meter for monitoring the light quantity of the laser beam entered the optical fiber in the ferrule is connected to the other end of the optical connector.

In this condition, the lens is moved relative to the laser beam from the LD along an optical axis (in a Z-axis direction) and in the directions perpendicular to the optical axis (in X-axis and Y-axis directions) to search for a position where the reading on the optical power meter shows a maximum value. When the reading on the optical power meter shows a maximum value, the adjustment of the lens is finished. Thereafter, the receptacle assembly and the sleeve are welded together at the interface therebetween, and the sleeve and the LD package are also welded together at the interface therebetween.

A semiconductor laser module in the above-mentioned receptacle LD module (Japanese Patent Laid-open No. Hei 11-295559) is assembled by fixing a receptacle in which a lens is inserted and fixed, a semiconductor laser apparatus retained to a laser holder, and a ring on an assembling jig, next inserting into the receptacle one end of a ferrule in which an optical fiber is inserted and fixed, the optical power meter being connected to the other end of the ferrule, next adjusting the optical axis, and finally fixing the laser holder and the ring at the interface therebetween and the ring and the receptacle at the interface therebetween by welding, bonding, etc.

Thus, the adjustment of the optical axis is carried out after inserting into the receptacle one end of the ferrule in which the optical fiber is inserted and fixed. However, the ferrule and the receptacle are not connected and the preset positional relation therebetween is not always maintained with a high accuracy even after the measurement. Further, also in the case of engaging the ferrule of the connector with a projecting portion of the receptacle, the insertion length of the ferrule slightly changes every time of insertion of the ferrule, so that the positional relation between the ferrule and the receptacle cannot be accurately maintained.

Further, there is a case that the incident end face of the ferrule is obliquely cut to prevent the reflection of a laser beam emitted from a semiconductor laser chip. In this case, the relation between the direction of cutting of the ferrule and the position of the semiconductor laser chip must be maintained constant. If rotation of the ferrule about its axis occurs during insertion of the ferrule into the receptacle, the ideal positional relation is lost to cause a reduction in reflection prevention efficiency. Accordingly, such a reduction in reflection prevention efficiency due to the rotation of the ferrule cannot be suppressed only by the idea of making the insertion length of the ferrule in the receptacle constant.

SUMMARY OF THE INVENTION

It is therefore an object of the present invention to provide a laser diode module which can be easily assembled and adjusted in optical axis and is suitable for maintenance of the positional relation between the components after adjustment of the optical axis.

It is another object of the present invention to provide an assembling method for a laser diode module which can be easily adjusted in optical axis.

In accordance with an aspect of the present invention, there is provided a laser diode module comprising a laser diode assembly including a base, a carrier fixed to the base, a laser diode mounted on the carrier, a cap fixed to the base so as to surround the laser diode, and a holder fixed to the base so as to surround the cap; a lens-fiber assembly including a casing having a first end, a second end, a first hole having a first diameter and a first axis, and a second hole having a second diameter smaller than the first diameter and a second axis offset from the first axis, the second hole communicating with the first hole, a lens inserted and fixed in the first hole from the first end of the casing, and a ferrule with an optical fiber embedded therein, the ferrule having a slant polished first end and a second end, the ferrule being inserted and fixed in the second hole from the second end of the casing so that a given distance is defined between the first end of the ferrule and the lens and that the second end of the ferrule projects from the second end of the casing; and a sleeve having a first end fixed to the holder and a second end to which the first end of the casing is fixedly inserted; the first end of the ferrule being positioned so that a portion of the first end of the ferrule radially farthest from the first axis of the first hole becomes axially farthest from the lens.

Preferably, the slant angle of the slant polished first end of the ferrule is set in the range of about 4° to about 8° with respect to a plane perpendicular to the axis of the ferrule. Further, the casing further has a third hole for making communication of the first and second holes between the lens and the ferrule with the ambient air, and a pin for closing the third hole.

In accordance with another aspect of the present invention, there is provided an assembling method for a laser diode module using a lens-fiber assembly including a casing having a first end, a second end, and a through hole, a lens inserted and fixed in the through hole, and a ferrule with an optical fiber embedded therein, the ferrule having a slant polished first end and a second end, the ferrule being inserted and fixed in the through hole so that a given distance is defined between the lens and the first end of the ferrule, the assembling method comprising the steps of setting a laser diode assembly having a laser diode and a holder, a sleeve, and the lens-fiber assembly on an assembling jig; optically connecting an optical power meter to the second end of the ferrule; bringing a first end of the sleeve into contact with the holder, and inserting the first end of the casing into the sleeve from a second end thereof; moving the lens-fiber assembly relative to the laser diode along an optical axis and in the directions perpendicular to the optical axis while monitoring the power of a laser beam emitted from the laser diode by using the optical power meter; and welding the sleeve and the holder and welding the sleeve and the casing at a position where the reading on the optical power meter shows a maximum value.

In accordance with a further aspect of the present invention, there is provided a laser diode module comprising a laser diode assembly including a base, a carrier fixed to the base, a laser diode mounted on the carrier, a cap fixed to the base so as to surround the laser diode, and a holder fixed to the base so as to surround the cap; and a lens-fiber assembly including a casing having a first end, a second end, a first hole having a first diameter and a first axis, and a second hole having a second diameter smaller than the first diameter and a second axis offset from the first axis, the second hole communicating with the first hole, a lens inserted and fixed in the first hole from the first end of the casing, and a ferrule with an optical fiber embedded therein, the ferrule having a slant polished first end and a second end, the ferrule being inserted and fixed in the second hole from the second end of the casing so that a given distance is defined between the first end of the ferrule and the lens and that the second end of the ferrule projects from the second end of the casing; the first end of the casing being fixed to the holder; the first end of the ferrule being positioned so that a portion of the first end of the ferrule radially farthest from the first axis of the first hole becomes axially farthest from the lens.

In accordance with a still further aspect of the present invention, there is provided an assembling method for a lens-fiber assembly, comprising the steps of preparing a casing having a first end, a second end, a first hole having a first diameter and a first axis, and a second hole having a second diameter smaller than the first diameter and a second axis offset from the first axis, the second hole communicating with the first hole; inserting a lens from the first end of the casing into the first hole of the casing, and fixing the lens at a given position; inserting a ferrule having a slant polished first end, a second end, and an optical fiber embedded therein from the second end of the casing into the second hole of the casing so as to satisfy a positional relation that a given distance is defined between the first end of the ferrule and the lens and that a portion of the first end of the ferrule radially farthest from the first axis of the first hole becomes axially farthest from the lens; and fixing the ferrule.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
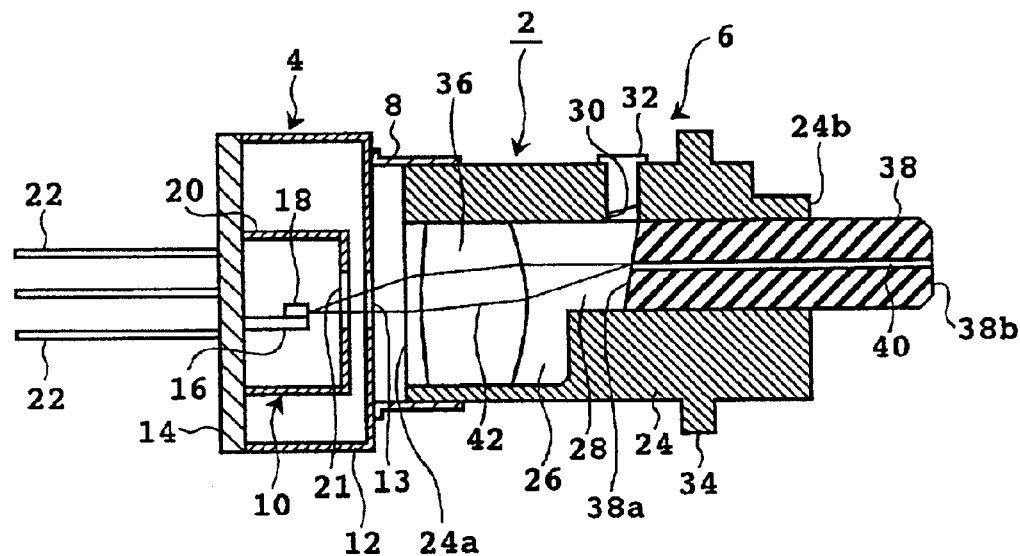
FIG. 1 is a sectional view of an LD module according to a first preferred embodiment of the present invention.

Referring to FIG. 1, there is shown a sectional view of a laser diode module (LD module) 2 according to a first preferred embodiment of the present invention. The LD module 2 includes a laser diode assembly (LD assembly) 4, a lens-fiber assembly 6, and a sleeve 8. The LD assembly 4 is composed of an LD package 10 and an LD holder 12 fixed to a base 14 of the LD package 10. The LD holder 12 is formed of stainless steel, and has an opening 13.

The base 14 of the LD package 10 is formed of Kovar. A carrier 16 formed of copper is fixed to the base 14, and a laser diode (LD) 18 is mounted on the carrier 16. The laser diode 18 is surrounded by a cap 20 fixed to the base 14. The cap 20 has a window 21 for allowing transmission of a laser beam. Terminals 22 for driving the laser diode 18 project from the base 14.

The lens-fiber assembly 6 includes a casing 24 formed of stainless steel. The casing 24 has a first end 24a, a second end 24b, a first hole 26 having a first diameter, and a second hole 28 having a second diameter smaller than the first diameter. The second hole 28 is offset from the first hole 26 (e.g., the axis of the hole 28 is shifted upward from the axis of the hole 26 as shown), and the first and second holes 26 and 28 are in communication with each other. The first and second holes 26 and 28 open to the first and second ends 24a and 24b of the casing 24, respectively.

The casing 24 further has a third hole 30 for making communication of the second hole 28 and the ambient air to release the inside air from the second hole 28. The third hole 30 is normally closed by a dustproof pin 32. The casing 24 has a connector guide 34 for guiding a connector to be connected to the LD module 2. The hole 30 is preferably formed at a position such that a space defined between a lens 36 and a ferrule 38 communicates with the ambient air through the hole 30. That is, the lens (aspherical lens) 36 is inserted in the first hole 26 of the casing 24 from the first end 24a, and is fixed by low-melting glass. The ferrule 38 in which an optical fiber 40 is embedded is press-fitted with the second hole 28 of the casing 24 from the second end 24b. The ferrule 38 has a slant polished first end 38a and a second end 38b. The distance between the first end 38a of the ferrule 38 and the lens 36 is set to a predetermined distance. The ferrule 38 is fixed in the second hole 28 mainly by a static frictional force acting between the wall surface of the hole 28 and the outer circumferential surface of the ferrule 38. The opposite ends of the optical fiber 40 are exposed to the first and second ends 38a and 38b of the ferrule 38.

The ferrule 38 is formed of zirconia, for example. The second end 38b of the ferrule 38 projects from the second end 24b of the casing 24 by a predetermined distance. The slant angle of the first end 38a of the ferrule 38 is set in the range of about 4° to about 8°, preferably set to about 6°, with respect to a plane perpendicular to the axis of the ferrule 38. The ferrule 38 is positioned in the second hole 28 in such a manner that a portion of the first end 38a radially farthest from the axis of the first hole 26 becomes axially farthest from the lens 36.

This positioning of the ferrule 38 is important from the viewpoints of efficient coupling of the laser beam emitted from the laser diode 18 to the optical fiber 40 and prevention of reflected feedback light to the laser diode 18. Reference numeral 42 denotes an optical path of the laser beam emitted from the laser diode 18. The LD module 2 according to this preferred embodiment is a so-called triaxial adjustable type LD module such that the lens 36 is adjustable with respect to the laser beam emitted from the laser diode 18 along the optical axis of the lens 36 (in a Z-axis direction) and in the directions perpendicular to the optical axis (in X-axis and Y-axis directions). The LD module 2 is used mainly in a trunk system.

There will now be described an assembling method for the LD module 2 according to the first preferred embodiment. First, the LD assembly 4, the lens-fiber assembly 6, and the sleeve 8 are set on an assembling jig. Secondly, an optical power meter is optically connected to the second end 38b of the ferrule 38, i.e., the end of the optical fiber 40 exposed to the second end 38b. More specifically, a ferrule projecting from one end of an optical connector to be connected to the LD module 2 is butted against the ferrule 38, and is connected through an elastic sleeve or the like to the ferrule 38. Further, the optical power meter is connected to the other end of the optical connector. Thereafter, one end of the sleeve 8 is brought into contact with the LD holder 12 of the LD assembly 4, and the first end 24a of the casing 24 is inserted into the sleeve 8 from its other end.

The lens-fiber assembly 6 is moved relative to the laser diode 18 along the optical axis (Z-axis direction) and in the directions perpendicular to the optical axis (X-axis and Y-axis directions) while monitoring the power of the laser beam emitted from the laser diode 18 by using the optical power meter. Finally, when the lens-fiber assembly 6 comes to a position where the reading on the optical power meter shows a maximum value, the sleeve 8 and the casing 24 are welded together, and the sleeve 8 and the LD holder 12 are further welded together. For example, laser spot welding is adoptable as the welding of these members 8, 24, and 12.

According to the assembling method for the LD module 2 as described above, the lens-fiber assembly 6 having a fixed optical positional relation between the lens 36 and the ferrule 38 is used to assemble the LD module 2. Accordingly, triaxial adjustment of the optical system can be easily performed, and an LD module having a high optical coupling efficiency can be easily assembled.

Figure 2:
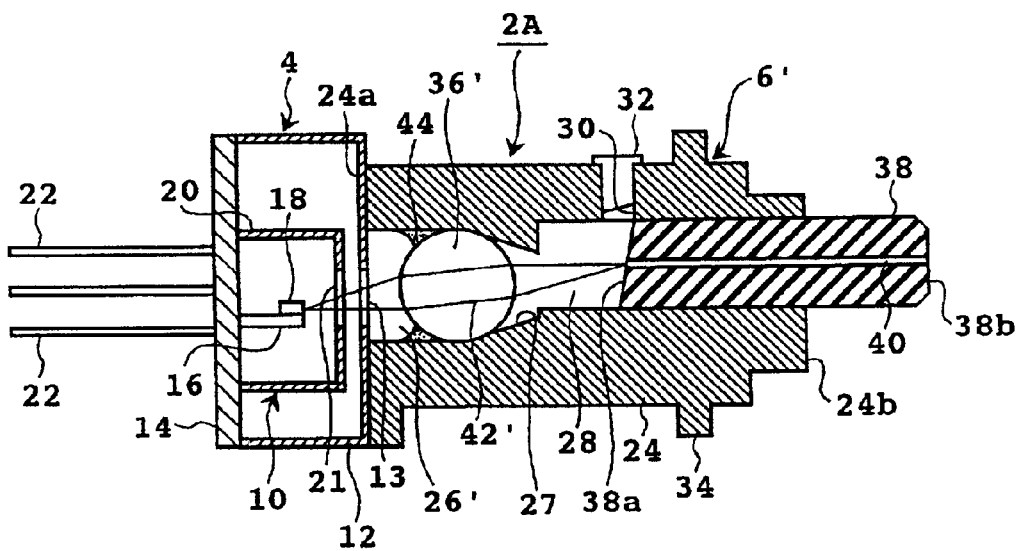
FIG. 2 is a sectional view of an LD module according to a second preferred embodiment of the present invention.

Referring next to FIG. 2, there is shown a sectional view of an LD module 2A according to a second preferred embodiment of the present invention. Substantially the same parts as those of the first preferred embodiment are denoted by the same reference numerals, and the description thereof will be omitted herein. The LD module 2A according to this preferred embodiment is of a biaxial adjustable type such that adjustment in the X-axis and Y-axis directions is allowed, and it is used mainly in a subscriber system. The LD module 2A includes an LD assembly 4 and a lens-fiber assembly 6' fixed to the LD assembly 4. The lens-fiber assembly 6' includes a casing 24 having a first end 24a, a second end 24b, a first hole 26' having a first diameter, and a second hole 28 offset from the first hole 26' and having a second diameter smaller than the first diameter. The first hole 26' has a tapering portion 27 whose diameter gradually decreases toward the second end 24b of the casing 24. The first hole 26' communicates at the tapering portion 27 with the first hole 28. The first and second holes 26' and 28 open to the first and second ends 24a and 24b of the casing 24, respectively.

A spherical lens 36' is inserted in the first hole 26' of the casing 24 from the first end 24a, and is fixed by low-melting glass 44. On the other hand, a ferrule 38 in which an optical fiber 40 is embedded is press-fitted with the second hole 28 of the casing 24 from the second end 24b. As similarly to the first preferred embodiment, the positioning of a slant polished first end 38a of the ferrule 38 to the spherical lens 36' is important. That is, the ferrule 38 is positioned in the second hole 28 in such a manner that a portion of the first end 38a radially farthest from the axis of the first hole 26' becomes axially farthest from the lens 36'.

There will now be described an assembling method for the LD module 2A according to the second preferred embodiment. First, the LD assembly 4 and the lens-fiber assembly 6' are set on an assembling jig. Secondly, an optical power meter is optically connected to the second end 38b of the ferrule 38, i.e., the end of the optical fiber 40 exposed to the second end 38b. More specifically, a ferrule projecting from one end of an optical connector to be connected to the LD module 2A is butted against the ferrule 38, and is connected through an elastic sleeve or the like to the ferrule 38. Further, the optical power meter is connected to the other end of the optical connector. Thereafter, the first end 24a of the casing 24 of the lens-fiber assembly 6' is brought into contact with the LD holder 12 of the LD assembly 4. In this condition, the lens-fiber assembly 6' is moved relative to the laser diode 18 in the directions perpendicular to the optical axis (X-axis and Y-axis directions) as monitoring the power of the laser beam emitted from the laser diode 18 by using the optical power meter. Finally, when the lens-fiber assembly 6' comes to a position where the reading on the optical power meter shows a maximum value, the casing 24 is welded to the LD holder 12. For example, laser spot welding is adoptable as the welding of these members 24 and 12.

The LD module 2A according to the second preferred embodiment does not employ the sleeve 8 of the LD module 2 according to the first preferred embodiment. Accordingly, the adjustment in position of the lens-fiber assembly 6' along the optical axis (Z-axis direction) cannot be performed. However, the relative positional relation between the laser diode 18, the spherical lens 36', and the first end 38a of the ferrule 38 along the optical axis can be optically designed, and the lens-fiber assembly 6' having a fixed positional relation between the lens 36' and the first end 38a of the ferrule 38 is used in this preferred embodiment. Accordingly, by simply adjusting the lens-fiber assembly 6' in the X-axis and Y-axis directions relative to the laser diode 18, the laser beam emitted from the laser diode 18 can be coupled to the end of the optical fiber 40 exposed to the first end 38a of the ferrule 38 with a sufficient efficiency. The LD module 2A according to this preferred embodiment is used mainly as a light source in a subscriber system.

Figure 3A:
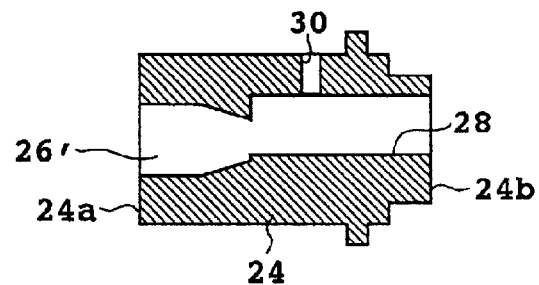
FIGS. 3A to 3F are sectional views for illustrating an assembling method for a lens-fiber assembly.

There will now be described an assembling method for the lens-fiber assembly 6' used in the LD module 2A according to the second preferred embodiment with reference to FIGS. 3A to 3F. Although not shown, an assembling method for the lens-fiber assembly 6 used in the LD module 2 according to the first preferred embodiment is similar to the following method. As shown in FIG. 3A, the casing 24 having the first hole 26', the second hole 28, and the third hole 30 for air vent is prepared. The casing 24 is formed of stainless steel, for example, and it is manufactured by metal injection molding, for example.

Figure 3B:
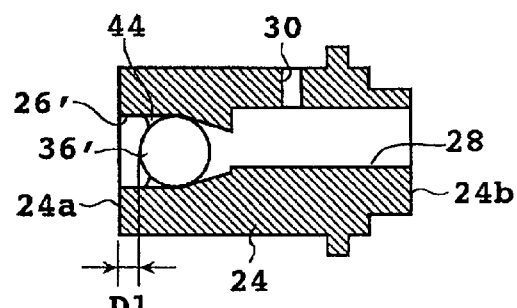
Figure 3C:
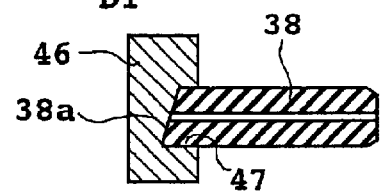
Figure 3D:
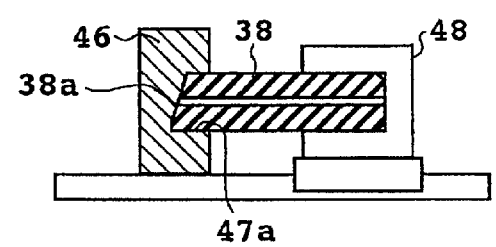

As shown in FIG. 3B, the spherical lens 36' is inserted into the second hole 26', and is fixed to the casing 24 by the low-melting glass 44 (having a melting point of about 400° C.). The spherical lens 36' is spaced a distance D1 from the first end 24a of the casing 24. The distance D1 is set to 0.24 mm±0.05 mm, for example. In the next step, the first end 38a of the ferrule 38 is inserted into a hole 47 of a face positioning jig 46 as shown in FIG. 3C to position the slant polished end 38a of the ferrule 38 so as to satisfy the above-mentioned condition in accordance with the offset relation between the holes 26' and 28. In this condition, the ferrule 38 is set in a ferrule inserting jig 48 as shown in FIG. 3D.

Figure 3E:
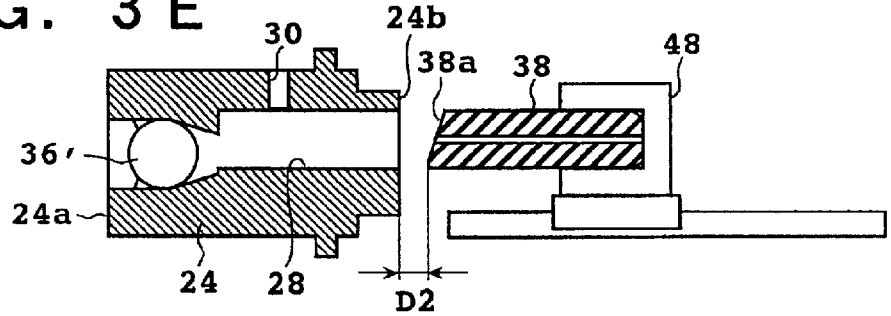
Figure 3F:
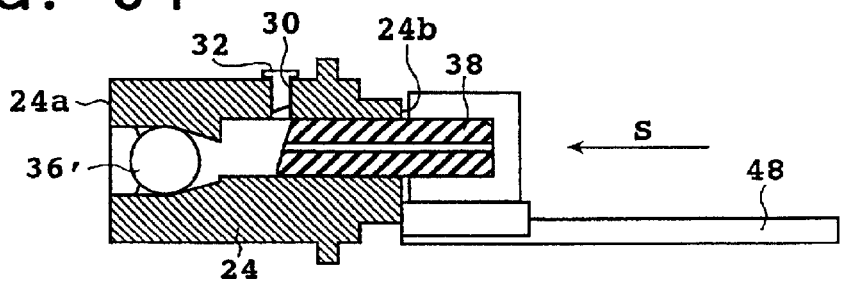

Thereafter, the casing 24 and the ferrule inserting jig 48 are set so that a given distance D2 is defined between the second end 24b of the casing 24 and the first end 38a of the ferrule 38 as shown in FIG. 3E. Finally, the ferrule 38 is press-fitted into the second hole 28 of the casing 24 by operating the ferrule inserting jig 48 as shown in FIG. 3F. The press-fit length of the ferrule 38 in the second hole 28 is controlled according to a feed amount S of the ferrule inserting jig 48. Alternatively, the press-fit length of the ferrule 38 may be controlled according to the amount of projection of the ferrule 38 from the second end 24b of the casing 24. The pressure of press-fit of the ferrule 38 is set to 40 to 130 kgf. After finishing the press-fit of the ferrule 38, dust or the like present in the space defined by the casing 24, the spherical lens 36' and the ferrule 38 is removed through the third hole 30 as required, and the third hole 30 is then closed by the dustproof pin 32 as shown in FIG. 3F.

Owing to the vent hole 30 formed through the wall of the casing 24, an increase in air pressure inside the casing 24 due to the press-fit of the ferrule 38 can be released from the vent hole 30, so that the ferrule 38 can be easily press-fitted into the hole 28. Accordingly, although the ferrule 38 is press-fitted into the hole 28 after fixing the spherical lens 36' to the casing 24 by means of the low-melting glass 44, there is no possibility that the lens 36' may be broken by the pressure. Further, the step of press-fitting the ferrule 38 may be performed prior to the step of inserting and fixing the lens 36'. Also in this case, there is no possibility that the ferrule 38 and its associated parts may be deformed by the heat applied to fuse the low-melting glass 44 up to its melting point. Further, after finishing the press-fit of the ferrule 38, the vent hole 30 must be closed by the dustproof pin 32 to prevent the entry of dust into the first and second holes 26' and 28.

Figure 4A:
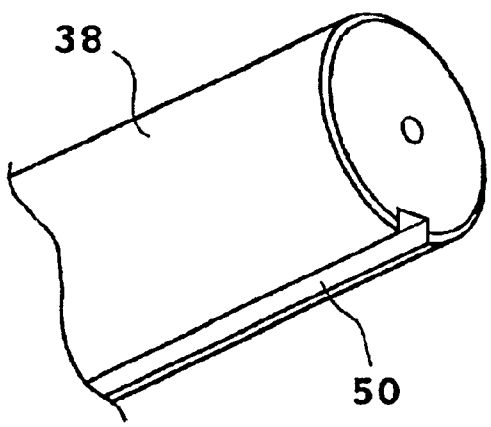
FIGS. 4A and 4B are perspective views for illustrating another ferrule positioning method.
Figure 4B:
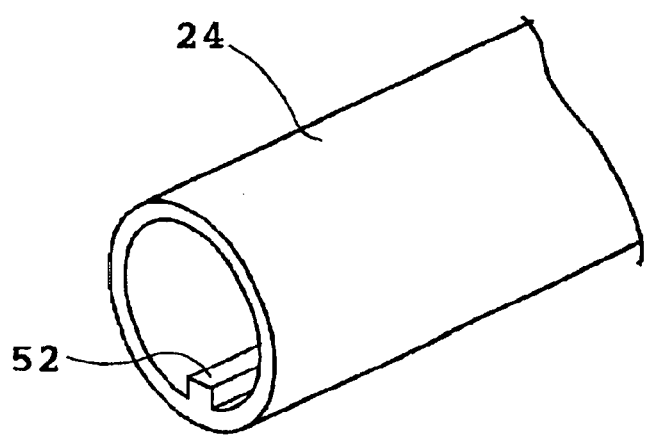

Referring to FIGS. 4A and 4B, there is shown another positioning method for the ferrule 38 without the use of the face positioning jig 46 shown in FIG. 3C. As shown in FIG. 4A, the ferrule 38 is formed with an axially extending groove 50, and as shown in FIG. 4B, the casing 24 is formed with an axially extending guide rail 52 adapted to engage the groove 50. Accordingly, by engaging the groove 50 of the ferrule 38 with the guide rail 52 of the casing 24 in inserting the ferrule 38 into the second hole 28 of the casing 24, the ferrule 38 is fixed in position to the casing 24. The guide rail 52 is formed at a position such that the slant polished end 38a of the ferrule 38 is directed so as to satisfy the above-mentioned condition according to the offset positional relation between the first and second holes 26' and 28. The groove 50 of the ferrule 38 may be formed by cutting or the like, and the guide rail 52 of the casing 24 may be formed at the same time the casing 24 is manufactured. Alternatively, the casing 24 may be formed with a groove, and the ferrule 38 may be formed with a guide rail adapted to engage this groove.

Figure 5A:
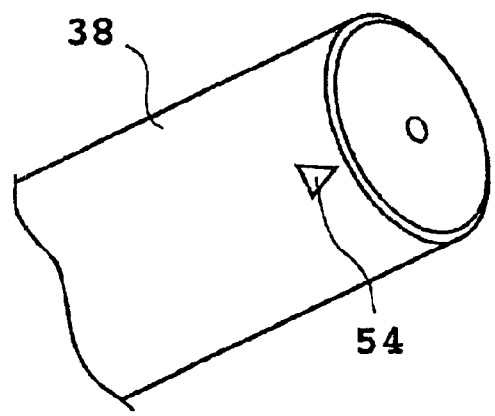
FIGS. 5A and 5B are perspective views for illustrating still another ferrule positioning method.
Figure 5B:
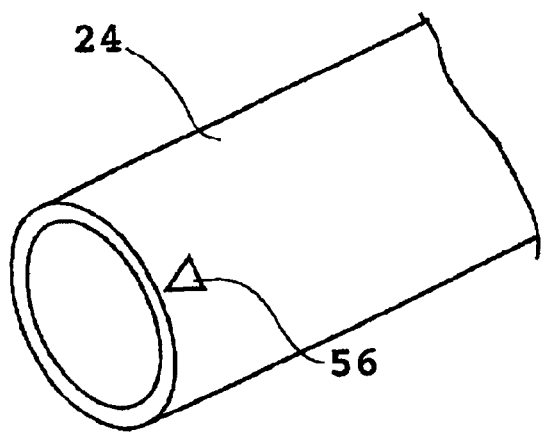

Referring to FIGS. 5A and 5B, there is shown still another positioning method for the ferrule 38. As shown in FIG. 5A, the ferrule 38 is provided with a marking 54 by print or laser, and as shown in FIG. 5B, the casing 24 is provided with a marking 56 by a similar method. By aligning the marking 54 of the ferrule 38 with the marking 56 of the casing 24 in inserting the ferrule 38 into the second hole 28 of the casing 24, the ferrule 38 can be fixed in position to the casing 24 so as to satisfy the above-mentioned condition according to the offset positional relation between the first and second holes 26' and 28.

Figure 6A:
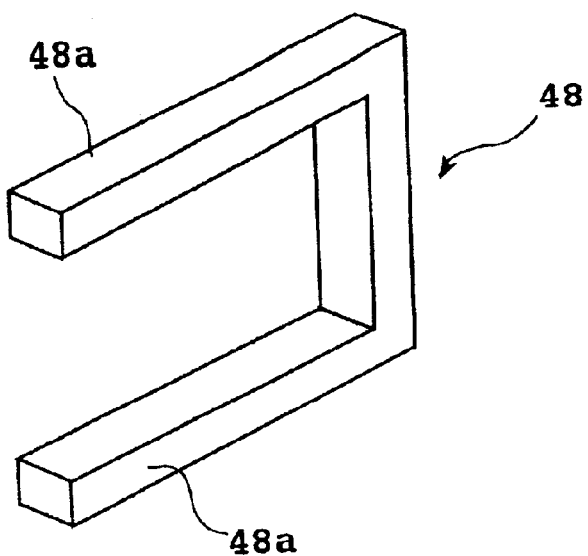
FIG. 6A is a perspective view showing a ferrule inserting jig.

FIG. 6A shows a ferrule inserting jig 48 of such a type that it holds the ferrule 38 in two opposite directions (e.g., from the upper and lower sides or the right and left sides). The ferrule inserting jig 48 has a pair of holding portions 48a for holding the outer circumferential surface of the ferrule 38 on the opposite sides. While each holding portion 48a has a flat inner surface adapted to come into contact with the outer circumferential surface of the ferrule 38 as shown, the inner surface of each holding portion 48a is preferably curved so as to correspond to the outer circumferential surface of the ferrule 38. Further, the ferrule inserting jig 48 may be modified so as to hold the ferrule 38 in three or more directions. With this structure, rotation of the ferrule 38 about its axis during insertion of the ferrule 38 into the hole 28 of the casing 24 can be effectively prevented as compared with the case that the second end 38b of the ferrule 38 is merely pushed in the axial direction.

Figure 6B:
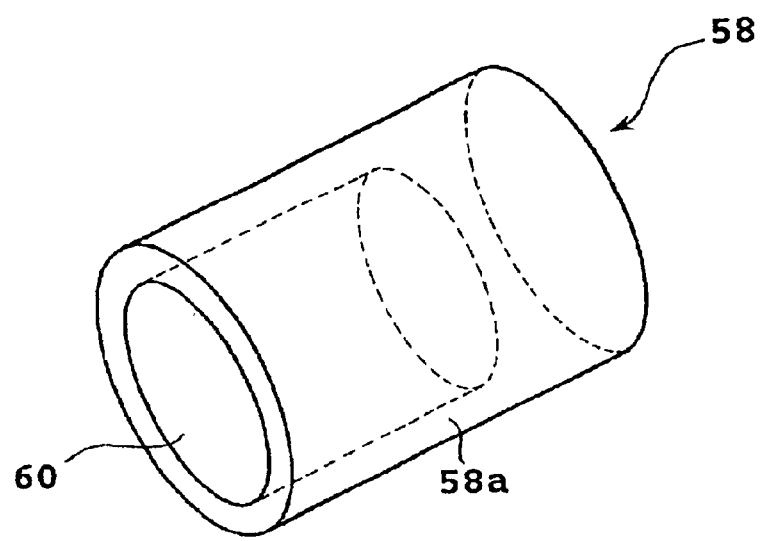
FIG. 6B is a perspective view showing another ferrule inserting jig.

FIG. 6B shows another type ferrule inserting jig 58 having a cylindrical shape. That is, the ferrule inserting jig 58 has a cylindrical ferrule holding portion 58a in which a ferrule insertion hole 60 is formed. With this structure, a large frictional force can be generated between the outer circumferential surface of the ferrule 38 inserted in the ferrule insertion hole 60 and the inner cylindrical surface of the ferrule holding portion 58a, thereby more effectively preventing the rotation of the ferrule 38 about its axis during insertion of the ferrule 38 into the hole 28 of the casing 24.

Further, the outer circumferential surface of the ferrule 38 may be formed with an axially extending groove as in FIG. 4A, and the inner surface of either ferrule holding portion 48a of the ferrule inserting jig 48 or the inner cylindrical surface of the ferrule holding portion 58a of the ferrule inserting jig 58 may be formed with an axially extending guide rail adapted to engage the groove of the ferrule 38. With this structure, the rotation of the ferrule 38 about its axis during insertion of the ferrule 38 into the hole 28 of the casing 24 can be more effectively prevented. In this case, a similar guide rail may be formed in the hole 28 of the casing 24 as shown in FIG. 4B.

According to the present invention as described above, the lens-fiber assembly constructed by fixing the lens and the ferrule to the casing in a given positional relationship is used to assemble the LD module. Accordingly, it is possible to easily assemble an LD module having a high optical coupling efficiency. Further, it is possible to provide an LD module which can be easily assembled and adjusted in optical axis and is suitable for maintenance of the positional relation after adjustment of the optical axis. According to the LD module of the present invention, it is possible to prevent a reduction in reflection prevention efficiency in inserting the ferrule. The ferrule of the lens-fiber assembly has the same shape as that of a ferrule of an optical connector to be connected to the LD module, so that the LD module of the present invention can be connected simply and highly reliably to the optical connector by using an elastic sleeve or the like.

What is claimed is:

1. A laser diode module, comprising:
   a laser diode assembly including a base, a carrier fixed to said base, a laser diode mounted on said carrier, a cap fixed to said base so as to surround said laser diode, and a holder fixed to said base so as to surround said cap and having a holder axis;
   a lens-fiber assembly comprising:
      a casing having a first casing end, a second casing end, a first casing hole having a first casing hole diameter and a first casing hole axis, and a second casing hole having a second casing hole diameter smaller than said first casing hole diameter and a second casing hole axis offset from said first casing hole axis, said second casing hole communicating with said first casing hole and an alignment rail positioned in the first casing hole aligned parallel with the second casing hole axis,
      a lens inserted and fixed in said first casing hole from said first casing end of said casing, and
      a ferrule with an optical fiber embedded therein, said ferrule having a slant polished first ferrule end and a second ferrule end and an alignment groove fitting said alignment rail aligning said slant polished first ferrule end with said lens, said ferrule being inserted and fixed in said second casing hole from said second casing end of said casing using said rail and groove so that a given distance and alignment is defined between said first ferrule end of said ferrule and said lens and that said second ferrule end of said ferrule projects from said second casing end of said casing; and
   a sleeve having a first sleeve end fixed to said holder and a second sleeve end to which said first casing end of said casing is fixedly inserted and having a sleeve axis;
   said first end of said ferrule being positioned so that a portion of said first ferrule end of said ferrule radially farthest from said first casing hole axis of said first casing hole becomes axially farthest from said lens.

2. A laser diode module according to claim 1, wherein the slant angle of said first ferrule end of said ferrule is set in the range of about 4° to about 8° with respect to a plane perpendicular to an axis of said ferrule.

3. A laser diode module according to claim 1, wherein said casing further has a third casing hole for making communication of said first and second casing holes between said lens and said ferrule with the ambient air, and a pin for closing said third casing hole.

4. A laser diode module, comprising:
   a laser diode assembly including a base, a carrier fixed to said base, a laser diode mounted on said carrier, a cap fixed to said base so as to surround said laser diode, and a holder fixed to said base so as to surround said cap and having a holder axis; and
   a lens-fiber assembly including a single piece casing not requiring assembly and having a first casing end, a second casing end, a first casing hole having a first casing hole diameter and a first casing hole axis, and a second casing hole having a second casing hole diameter smaller than said first casing hole diameter and a second casing hole axis offset from said first casing hole axis, said second casing hole communicating with said first casing hole, a lens inserted and fixed in said first casing hole from said first casing end of said casing, and a ferrule with an optical fiber embedded therein, said ferrule having a slant polished first ferrule end and a second ferrule end, said ferrule being inserted and fixed in said second casing hole from said second casing end of said casing so that a given distance is defined between said first ferrule end of said ferrule and said lens and that said second ferrule end of said ferrule projects from said second casing end of said casing;
   said first casing end of said casing being fixed to said holder;
   said first ferrule end of said ferrule being positioned so that a portion of said first ferrule end of said ferrule radially farthest from said first casing hole axis of said first casing hole becomes axially farthest from said lens.

5. A laser diode module according to claim 4, wherein the slant angle of said first ferrule end of said ferrule is set in the range of about 4° to about 8° with respect to plane perpendicular to an axis of said ferrule.

6. A laser diode module, comprising:
   a laser diode; and
   a lens-fiber assembly including a single piece casing not requiring assembly and having a first casing hole and a second casing hole offset from said first casing hole, a lens fixed in said first casing hole, and an optical fiber provided in said second casing hole, said lens-fiber assembly guiding a laser beam emitted from said laser diode through said lens to said optical fiber;

said optical fiber being inserted and fixed in a ferrule press-fitted with said second casing hole.

7. A laser diode module, comprising:

a laser diode; and a lens-fiber assembly including a casing having a first casing hole and a second casing hole offset from said first casing hole, a lens fixed in said first casing hole, and an optical fiber provided in said second casing hole, said lens-fiber assembly guiding a laser beam emitted from said laser diode through said lens to said optical fiber;

said optical fiber being inserted and fixed in a ferrule press-fitted with said second casing hole;

said ferrule having a first ferrule end inserted in said second casing hole and a second ferrule end projecting from said second casing hole, said first ferrule end of said ferrule being inclined a given angle with respect to an axial direction of said ferrule; and one of the outer circumferential surface of said ferrule and a wall surface of said casing defining said second casing hole is formed with an axially extending guide rail, and the other is formed with an axially extending groove adapted to engage said guide rail.

8. A laser diode module, comprising:

a laser diode;

a lens-fiber assembly including a casing having a first casing hole and a second casing hole offset from said first casing hole, a lens fixed in said first casing hole, and an optical fiber provided in said second casing hole, said lens-fiber assembly guiding a laser beam emitted from said laser diode through said lens to said optical fiber, said optical fiber being inserted and fixed in a ferrule press-fitted with said second casing hole;

a third casing hole for making communication of said first and second casing holes between said lens and said ferrule with the ambient air; and a removable plug allowing air evacuation during fixing of the lens and fitting of the ferrule.

9. A laser diode module, comprising:

a laser diode assembly comprising a laser diode and a holder with said diode fixed relative to said holder and said holder having a holder axis;

a lens-fiber assembly including a single piece casing not requiring assembly and having a first casing end, a second casing end, a first casing hole having a first casing hole diameter and a first casing hole axis, and a second casing hole having a second casing hole diameter smaller than said first casing hole diameter and a second casing hole axis offset from said first casing hole axis, said second casing hole communicating with said first casing hole, a lens inserted and fixed in said first casing hole from said first casing end of said casing, and a ferrule with an optical fiber embedded therein, said ferrule having a slant polished first ferrule end and a second ferrule end, said ferrule being inserted and fixed in said second casing hole from said second casing end of said casing so that a given distance is defined between said first ferrule end of said ferrule and said lens and that said second ferrule end of said ferrule projects from said second casing end of said casing; and a sleeve having a first sleeve end fixed to said holder and a second sleeve end to which said first casing end of said casing is fixedly inserted and having a sleeve axis;

said first end of said ferrule being positioned so that a portion of said first ferrule end of said ferrule radially farthest from said first casing hole axis of said first casing hole becomes axially farthest from said lens.

* * * * *